(12) United States Patent
Elkmann et al.

(10) Patent No.: US 10,891,487 B2
(45) Date of Patent: Jan. 12, 2021

(54) APPLIANCE AND METHOD FOR CREATING AND MONITORING A SAFETY AREA IN A WORKING SPACE

(71) Applicant: Fraunhofer-Gesellschaft zur Förderung der angewandten Forschung e.V., Munich (DE)

(72) Inventors: Norbert Elkmann, Magdeburg (DE); Christoph Walter, Magdeburg (DE); Christian Vogel, Magdeburg (DE)

(73) Assignee: Fraunhofer-Geselleschaft zur Förderung der angewandten Forschung e. V., Munich (DE)

( * ) Notice: Subject to any disclaimer, the term of this patent is extended or adjusted under 35 U.S.C. 154(b) by 0 days.

(21) Appl. No.: 16/520,916

(22) Filed: Jul. 24, 2019

(65) Prior Publication Data

US 2020/0110939 A1 Apr. 9, 2020

(30) Foreign Application Priority Data

Jul. 27, 2018 (EP) .................................. 18 186 017

(51) Int. Cl.
*H04N 5/222* (2006.01)
*G06K 9/00* (2006.01)
*G06K 9/20* (2006.01)

(52) U.S. Cl.
CPC ...... *G06K 9/00711* (2013.01); *G06K 9/00771* (2013.01); *G06K 9/2036* (2013.01); *G06K 2009/00738* (2013.01)

(58) Field of Classification Search
CPC ........... G06K 9/00711; G06K 9/00771; G06K 9/2036; G06K 2009/00738; H04N 13/02
(Continued)

(56) References Cited

U.S. PATENT DOCUMENTS

| 2013/0201292 A1* | 8/2013 | Walter | F16P 3/14 |
| | | | 348/47 |
| 2014/0206380 A1* | 7/2014 | Do | H04W 16/20 |
| | | | 455/456.1 |

(Continued)

FOREIGN PATENT DOCUMENTS

| DE | 102016101793 B3 | 4/2017 |
| EP | 1164556 A2 | 12/2001 |
| EP | 2558886 A2 | 2/2013 |

OTHER PUBLICATIONS

"European Application Serial No. 18186017.2, European Search Report dated Feb. 1, 2019", (Feb. 1, 2019), 7 pgs.

*Primary Examiner* — Usman A Khan
(74) *Attorney, Agent, or Firm* — Schwegman Lundberg & Woessner, P.A.

(57) ABSTRACT

The application relates to an appliance (1) for creating and monitoring a safety area (2) in a working space (3). The suggested appliance (1) comprises a recording device (4). The recording device (4) is configured to record images in a monitoring area (8) which encompasses the safety area (2). The appliance (1) further comprises an illumination device (5) which is configured to project lines or patterns which define the safety area (2), into the working space (3). Furthermore, the appliance (1) comprises an evaluation device (9) which is configured to evaluate the images which are recorded by the recording device (4), with respect to a violation of the safety area (2). The illumination device (5) is configured to project a temporally coded sequence (11, 11', 11", 11'", 11"") of the lines (6) or patterns into the working space (3). Furthermore, the evaluation device (9) is configured to compare images of the temporally coded sequence (11, 11', 11", 11'", 11"") of the lines (6) or patterns with the expected sequence and to output a violation signal if the images of the temporally coded sequence (11,
(Continued)

Figure 1:
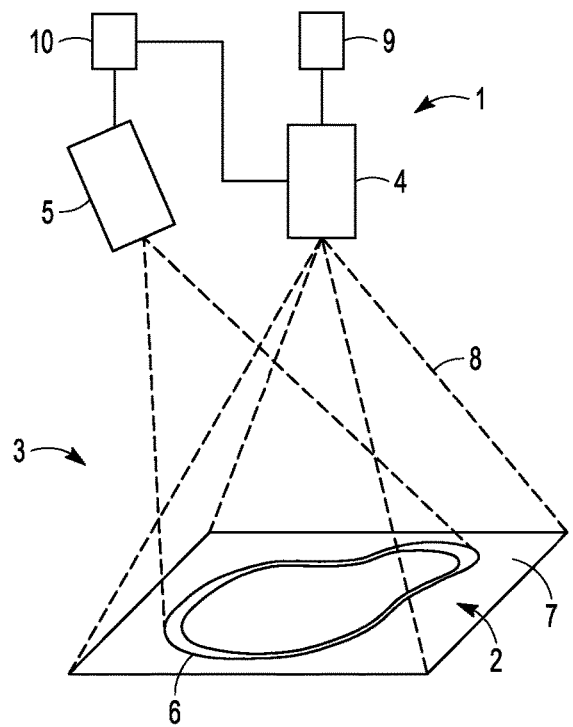

11', 11", 11'", 11"") do not correspond to the expected sequence.

14 Claims, 4 Drawing Sheets

(58) Field of Classification Search
USPC .......................................... 348/370, 46, 47
See application file for complete search history.

(56) References Cited

U.S. PATENT DOCUMENTS

2016/0124238 A1* 5/2016 Hoang ............... G02B 26/0825
353/8
2017/0219708 A1* 8/2017 Gebauer ................. G01S 7/481

* cited by examiner

APPLIANCE AND METHOD FOR CREATING AND MONITORING A SAFETY AREA IN A WORKING SPACE

The present application lies in the field of a factory operation and factory automation. The application relates to an appliance for creating and monitoring a safety area in a working space. Furthermore, the present invention relates to a method for creating and monitoring the safety area.

Projection-based and camera-based sensor systems which projects safety areas—for example in the form of lines or points—into the working space and monitor them with regard to an interruption by way of cameras, can be used for securing a dangerous machine or a dangerous robot, for ensuring the safety of a human working in a working space. Violations of the safety areas can be detected in this manner.

An extraction of the projection beams in images which are recorded by the camera are necessary for monitoring the safety areas by the cameras. For example, the document EP 2 558 886 B1 describes an appliance for monitoring at least one three-dimensional safety area, in particular a space in common working spaces of humans and machines. Hereby, markings which define the safety area are projected as modulated light with a defined frequency onto a floor of a monitoring area. Hereby, the modulation can be carried out for example on the basis of brightness and/or colour changes. The modulation leads to the lines which define the safety area being projected and not projected in an alternating manner. A recording of camera images by a recording device is hereby synchronised to the predefined frequency of the modulation. For evaluating and determining whether a person or an object intrudes into the safety area, two consecutive camera images which correspond to a projection and a non-projection of the safety area are used. A differential image is generated from the two camera images and this is subsequently evaluated with regard to a violation of the safety area.

Against the background of the previously known state of the art, it is the objective of the present invention to suggest an improved appliance for creating and monitoring a safety area in a working space. In particular, it is an objective to suggest an appliance which permits a particularly reliable detection of a safety area and is herein designed in a comparatively uncomplicated manner. It is further an objective of the present application to suggest a correspondingly advantageous method for creating and monitoring a safety area in a working space.

These objectives are achieved by an appliance according to claim 1 as well as by a method according to the further claim. Advantageous further developments result from the features of the dependent claims and of the embodiment examples.

The suggested appliance for creating and monitoring a safety area in a working space comprises a recording device. The recording device is configured to record images in a monitoring area which encompasses the safety area. Furthermore, the appliance comprises an illumination device which for example can be a projector. The illumination device is configured to project lines or patterns which define the safety area, into the working space. Furthermore, the appliance comprises an evaluation device which is configured to evaluate the images which are recorded by the recording device, with regard to a violation of the safety area. The appliance differs from the known state of the art at least by way of the illumination device being configured to project a temporally coded sequence of the lines or patterns into the working space, in particular to repeatedly project a temporally coded sequence of the lines or patterns into the working space. Furthermore, the evaluation device is configured to compare images of the temporally coded sequence of the lines or patterns with an expected sequence and to output a violation signal if the images of the temporally coded sequence do not correspond to the expected sequence. In particular, the evaluation device can be configured to repeatedly compare images of the temporally coded sequence of the lines or patterns with the expected sequence and to output a violation signal if the images of the temporally coded sequence do not correspond to the expected sequence.

A temporally coded sequence in the context of this application is to be understood as a sequence which goes beyond an alternating projecting of equally long, different light signals such as for example a simple on/off or a single intensity or colour change, at a location, from a temporal and/or spatial point of view. For example, this temporally coded sequence can be given by a spatial modulation of the projected lines or patterns and/or by a sequence with more than two consecutive projection states, as is described below in more detail. The temporally coded sequence can also be defined in that the recording device evaluates more than two consecutive images for the detection of a violation of the safety area. Concerning the temporally coded sequence, it is therefore not the case of a simple projection with a stationary frequency with an evaluation of only two consecutive images. A projected pattern can also be understood for example as an extensive illumination, a collection of projected points or an individual projected point. In some embodiments, the pattern can also comprise a multitude of rectangles as structuring elements.

By way of a violation of the safety area being detected by the suggested appliance and by way of a violation signal being outputted in the case of a violation, collisions for example between machine and humans can be avoided, so that the working safety in the workings space is increased.

As a rule, images of at least one, in particular precisely one sequence are evaluated for each detection or non-detection of a violation of the safety area. The temporally coded sequence can hereby be repeatedly projected into the working space and evaluated, in order to detect possible violations of the safety area at later points in time. A violation can be caused for example by way of the intrusion of an object, of a machine or of a human into the safety area.

Due to the fact that a temporally coded sequence of lines or patterns is projected, the images of which are evaluated, an unambiguous and robust, i.e. reliable extraction of the projection beams in the images is achieved. The suggested appliance permits the reliable extraction, in particular given sudden disturbing influences from the surroundings, such as for example given changes of the surrounding light, in particular given flashlight. For example, given known appliances, flashlight can cover up the light of the illumination device should it be simultaneously incident with this. With the known devices therefore, there is an increased probability of a violation of a safety area incorrectly not being detected, although an object or a human has intruded into the safety area. Here, this danger can be reduced by way of the use of the temporally coded sequence.

Due to the fact that several projection images are projected in the temporal sequence and recorded again, disturbing influences (e.g. flashlight) which could basically compromise or even prevent the functional capability and/or performance of the monitoring system can be discovered by the system. The system can output a signal (violation signal) which points to these environmental conditions which are not favourable to the monitoring system. Herein, it is important that the monitoring system indeed generates no false signal and hence continues to be in a secure state. For example, given a sequence of five projection images, with the third image the system could detect a disturbance precisely when a flashlight is incident at the point in time of the third image and leads to the state (on) being detected instead of the state (off). Since the other states of the images correspond to the expected states, a disturbing influence can be assumed here. The difference to a "real" violation of the safety area by an object, human or machine is that this violation would be detected in several (at least two) consecutive images. For this, the images must be recorded at a correspondingly high frame rate.

The suggested method is accordingly advantageous for creating and monitoring a safety area in a working space. Hereby, the appliance which is designed as described above and hereinafter is provided. The temporally coded sequence of the lines or patterns, said lines or patterns defining the safety area, are subsequently repeatedly projected into the workings space by the illumination device. In a further step, the images of the temporally coded sequence of the lines or patterns are recorded by the recording device. Furthermore, the images of the temporally coded sequence of the lines or patterns are repeatedly compared to an expected sequence by way of the evaluation device. Furthermore, a violation signal is outputted by the evaluation device if the images of the temporally coded sequence do not correspond to the expected sequence.

As a rule, one envisages the temporally coded sequence of projected lines and patterns comprising at least two consecutive projection states, so that at least two images are evaluated for determining the violation of the safety area. It can be particularly advantageous if the temporally coded sequence of projected lines and patterns comprise at least three consecutive projection states. In this case, at least three images are evaluated for determining the violation of the safety area. As a rule, the same number of consecutive projection states is projected in the sequence as by way of the evaluation device for determining an individual violation at a point in time.

The consecutive projection states of the sequence do not necessarily need to be all different in pairs. However, as a rule, at least two projection states of the sequence are different. One can also envisage the temporally coded sequence consisting of two different projection states. Different projection states of the sequence can be on (pattern or lines are projected) and off (no light is projected). As a rule, by way of this, a good contrast between the projection states can be achieved, by which means the evaluation by the evaluation device can be simplified. An exemplary sequence of projections in this case would be off/on/on/off/on, with regard to which the precisely two different projection states off and on are used.

In some embodiments, one can envisage the spatial distribution of the projected light being the same in all envisaged projection states of the sequence, in which light is projected. By way of this, a comparatively simple construction of projection optics of the illumination device can be sufficient. A coding of the sequence can be effected for example by way of a modulation of the intensity or of the wavelength, in particular of the colour. Additionally or alternatively, it can be useful and envisaged for the temporally coded sequence of the projected lines or patterns to also comprise a spatial modulation of the projected lines or patterns. In this case, at least two of the consecutive projection states of the sequence have a different spatial distribution of projected light. As a rule, the illumination device is activated by a computer or by way of the control unit which is described below, so that the illumination device projects the corresponding sequences into the working space. Corresponding activation programs are carried out on the computer or control unit. However, in other embodiments, the illumination device can comprise for example temporally modulated aperture optics which create the projection of the respective sequences. For example, the illumination device can be a projector. However, one can also envisage the illumination device being an LED matrix, an LED array or a segmented LED display. The illumination device can comprise suitable optics, for example comprising MEMS mirror elements, for the projection of the sequence of lines or patterns.

If the temporally coded sequence of the projected lines or patterns comprises the spatial modulation, then it can be particularly advantageous if the sequence comprises only two different projection states. In this case, as a rule only two images are necessary for the detection or non-detection of the violation of the safety area. In such an embodiment, the evaluation with regard to the violation can be carried out in a very rapid manner. Prescribed safety distances between humans and dangerous machines can be advantageously reduced by way of this.

A pattern or a projected line which is projected by the illumination device can correspond for example to an edging of the safety area. For example, the illumination device can be configured to project a boundary line of the safety area into the working space. In this case, the boundary line as a rule defines the safety area. Given a spatial modulation of the projection states of the sequence, one can envisage the temporally coded sequence of the projected lines or patterns comprising a consecutive illumination of different sections of a boundary line of this safety area. Typically, the boundary line of the safety area forms a closed line. The sequence of the projected lines or patterns can comprise a sectionwise consecutive illumination of the complete boundary line. For example, the boundary line can be illuminated orbitally in sections by the sequence of projection states. Hereby, one can envisage the boundary line being completely illuminated within the sequence. The projected light can orbit the boundary line for example one or several times in the sequence.

In particularly preferred embodiments, the temporally coded sequence of the projected lines or patterns can consist of projection states which correspond to an interrupted boundary line. For example, the interrupted boundary line can have a shape of a dashed line which consists of illuminated and non-illuminated sections. In particular, each of the projection states can correspond to an interrupted boundary line. In a preferred embodiment, one also envisages the temporally coded sequence of the projected lines or patterns comprising an alternating illumination of different sections of the boundary line. In this case, the sequence can comprise precisely two projection states. This embodiment permits a particularly rapid and reliable recognition of the violation of the safety area. One can envisage the sections being selected adequately small, so that a violation of the safety area by an object to a high probability results in a covering of two adjacent ones of the alternately illuminated sections. In this manner, a violation of the safety area can also be reliably detected if for example one of the projection states is covered up by a simultaneous disturbance signal, for example a flashlight. At least some of the sections can therefore be comparatively short in some possible embodiments and have a length of maximally 50 cm, preferably maximally 20 cm, and particularly preferably maximally 5 cm, for example 1 cm.

The projections states can advantageously be designed such that the boundary line is continuous and closed given an imaged superposition of the projection states, so that an intrusion into the safety area can be reliably detected at each location of the boundary line.

In some embodiments, the evaluation device is configured to form differential images from at least two of the images of the temporally coded sequence. Furthermore, the evaluation device can be configured to compare the differential images with the expected sequence. By way of the differential image formation, a suppression of disturbing influences can be effected in a simple manner, concerning which only or at least predominantly the changes of the consecutive projection states in the sequence determine the images. Disturbing influences in the monitoring area which do not change on the same time scale as the projection states however do not influence the images or only to a low extent.

A single sequence as a rule always corresponds to only one stationary safety area. This however does not need to be static, but can be changing with time, i.e. dynamically. For example, the safety area can change when a working situation in the working space changes. In particular, the safety area can adapt dynamically in size, shape and position depending on the state of a machine or robot. Minimal safety areas can be generated and monitored by way of this and a maximal area for humans can be provided. The appliance can comprise for example a control unit which is connected to the illumination device. The control unit is typically connected to the recording device and/or to the illumination device. The control unit can be configured to activate the illumination device for adapting the safety area to changed working situations, in a manner such that the illumination device projects temporally changing sequences of lines or patterns into two working space. A safety area which is located at another location or has a different extension can therefore be created and monitored at a point in time of a later sequence.

One can envisage the illumination device being configured to project different projection states of a sequence of lines or patterns into a working space at a frequency of at least 10 Hz, preferably at least 50 Hz, for example at least 200 Hz. A duration of a sequence can be kept particularly short by way of by way of a rapid projections of different projection sates, so that the appliance can react rapidly to violations of the safety area. Furthermore, the projected light in this case can be extracted in a particularly reliably manner since disturbing influences as a rule occur over longer time scales, which in particular can act advantageously given the aforedescribed formation of differential images. The recording device is hereby configured to recorded images in just as quick a succession. Typically, the illumination device and the recording device are temporally synchronised with one another, so that an image is recorded by the recording device whilst the illumination device projects lines or patterns according to a desired projection state. The control unit can comprise for example a clock generator for the synchronisation of the illumination device and the recording device.

The recording device in most embodiments comprises a camera, for example a CCD camera or a CMOS camera.

In typical embodiments, the illumination device is configured to project lines or patterns into the workings space, said lines or patterns defining a safety area with a base area of at least 1 m2. As a rule, the recording device is configured to record images in an at least correspondingly large monitoring area. Such a safety area is suitable for permitting a safe human robot cooperation in the working space. In particular, in the field of large robots, one can however also envisage the illumination device being configured to project lines or patterns which define a safety area with a base area of at least 5 m2, for example 5-25 m2, into the working space.

The expected sequence as a rule contains information on an expected sequence of images which in the case of a spatial modulation of the projected patterns or lines also comprises information on the expected spatial distribution of the images. Normally, the expected sequence of images corresponds to a situation, in which no violation of the safety area is present or only a controlled or expected violation occurs. The expected sequence comprises for example a colour and/or intensity course which is expected within the sequence for relevant pixels of a recorded image. For a simplified and quicker valuation, one can envisage only relevant pixels which correspond to a subset of all the recorded pixels of the images being taken into account on evaluation, if the expected sequence is expected to provide relevant information of the violation of the safety area only at these pixels.

Given an installation of the appliance in the working space, the recording device and the illumination device can firstly be aligned relative to one another and with regard to the desired safety area. The recording device and the illumination device can subsequently be calibrated. The expected sequence, i.e. a reference sequence of target images, in preferred embodiments can be generated in a purely virtual manner without a recording to the non-violated safety area being absolutely necessary before or during the starting operation. The evaluation device typically comprises a computer which is equipped with programs which carry out the method steps which are described above and hereinafter.

The features which are described above and hereinafter with reference to the appliance for creating and monitoring a safety area can be conferred upon the method for generating and monitoring the safety area and vice versa.

Figure 2:
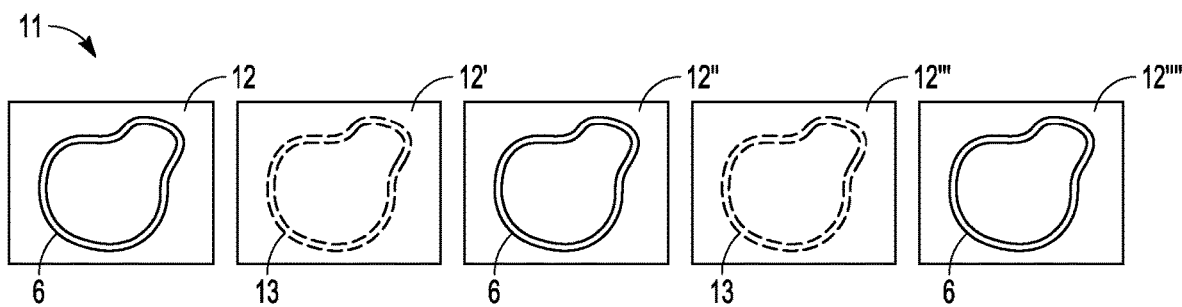
Figure 6:
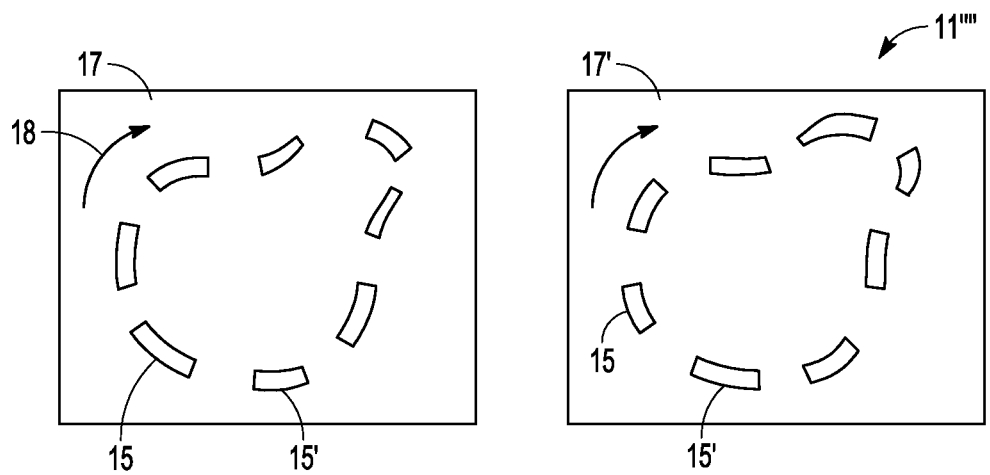
Figure 7:
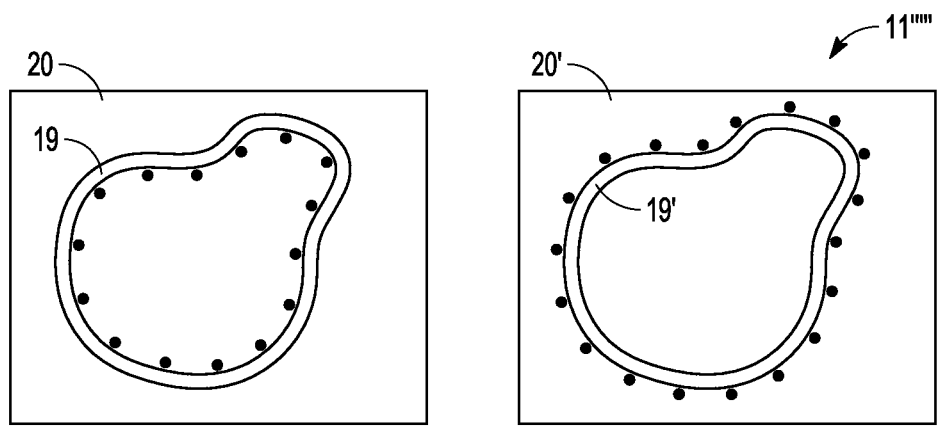
Figure 8A:
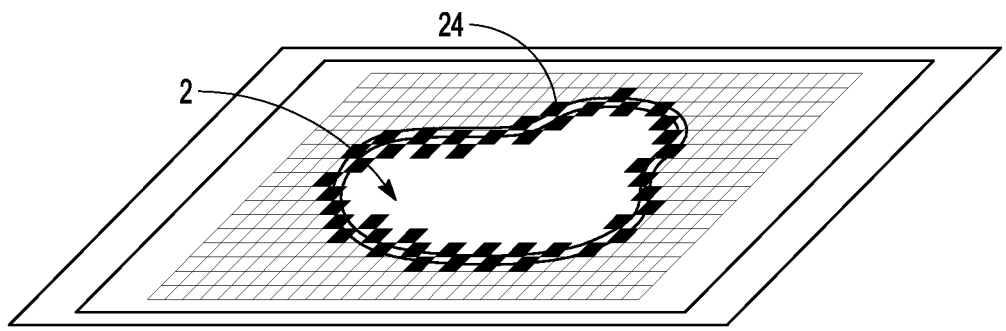
Figure 8B:
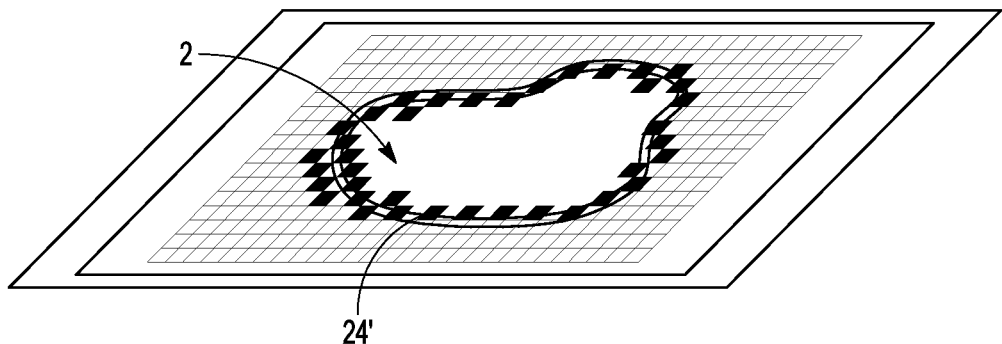

Embodiment examples are hereinafter described by way of the figures. There are shown in:

FIG. 1 a schematic view of an appliance for creating and monitoring a safety area in a working space, FIG. 2 a sequence of projections states which is projected by a projector, FIGS. 3 to 7 further sequences of projection states which are projected by the projector and FIGS. 8(a) and 8(b) a further sequence of projection states which is projected by an illumination device.

FIG. 1 shows a schematic view of an appliance 1 for producing and monitoring a safety area 2 in a working space 3. The appliance 1 comprises a recording device 4 which for example is designed as a CMOS camera, and an illumination device 5 which is designed for example as a projector or in other embodiments for example as an LED matrix or LED array. In the shown example, the projector 5 projects a sequence of markings which is coded temporally and possible spatially and is represented in the form of a line 6, onto a floor 7 of a working space 3. The represented line 6 corresponds to one possible projection state, wherein for example projections states can be projected by the projector 5 at a frequency of 200 Hz. Instead of lines, for example points or other patterns can also be projected into the working space 3. The recording device 4 records images of this sequence in a monitoring area 8.

The appliance 1 further comprises an evaluation device 9 which is connected to the recording device 4 and which for example can be a computer and be configured to evaluate the images of the sequence of lines 6 which are recorded by the recording device 4, with regard to a violation of the safety area 2. For this purpose, the evaluation device 9 can comprise an image processing program which is based on algorithms for the evaluation of camera data which is present as pixel maps. A control unit 10 is additionally provided, said control unit being connected to the projector 5 and the recording device 4 and being configured to synchronise the recordings by the recording device 4 with individual projection states of the sequence of lines 6 which is projected by the projector 5. In some embodiments, the control unit 10 and the evaluation device 9 can be designed separately or as an individual computer.

The line 6 which is represented in FIG. 1 and in further figures is an individual, continuous boundary line which defines the border of the safety area 2. A base area of the safety area 2 can be for example 1-25 m2, in particular 3 or 20 m2. The two continuous lines which are represented in FIG. 1 are to represent the edges of this individual, homogeneously illuminated line 6.

FIG. 2 shows a sequence 11 of projection states 12, 12' 12", 12''', 12'''' which represented from the left to the right are projected in a temporally successive manner into the working space 3 by the projector 5. Recurring features in this and in the subsequent figures are provided with the same reference numerals. The projection states 12, 12' 12", 12''', 12'''' correspond to the images which are recorded by the recording device 4. Whereas the line 6 is projected in the projection states with the reference numerals 12, 12" and 12'''', the projection states 12', 12''' which lie temporally therebetween have no projected line, which is indicated by the dashed lines with the reference numeral 13. The projection states 12, 12' 12", 12''', 12'''' therefore form the sequence 11 which is repeatedly projected into the working space 3 by the projector 5. This sequence 11 corresponds to the sequence of states on/off/on/off/on. For ascertaining whether a violation of the safety area 2 is present, the evaluation unit 9 evaluates all five images of the sequence 11 by way of the recorded sequence of images being compared to an expected sequence of images. The expected sequence of images is computed by way of a computer program and comprises a temporal sequence of brightness and/or colour values which are expected of the pixels of the images and which correspond to a situation on a non-violated safety area 2. For evaluating the sequence of images, one can envisage the evaluation unit 9 forming and evaluating differential images from the images.

Given a violation of the safety area 2, for example by way of a human, a machine, e.g. an industrial robot, or another object intruding into the safety area 2, projection beams are interrupted, so that the line 6 is at least partly covered. In the image, the line in this case comprises for example an interruption or a changed course. The sequence of images which is recorded by the recording device 4 therefore no longer corresponds to the expected sequence. If such a deviation is detected, then the evaluation device 9 outputs a violation signal which can lead for example to an emergency stop of moving machines in the region of the safety area 2, so that collisions in the working space 3 can be avoided.

One can envisage the control unit 10 adapting the safety area 2 to changed working situations at a later point in time. For this, for example the control unit 10 can activate the projector 5 such that this, from a later point in time, projects sequences which define a boundary line with a different shape, position and/or size. In this case, new expected sequences of images are computed and are used on evaluation with regard to the violation of the safety area 2.

Figure 3:
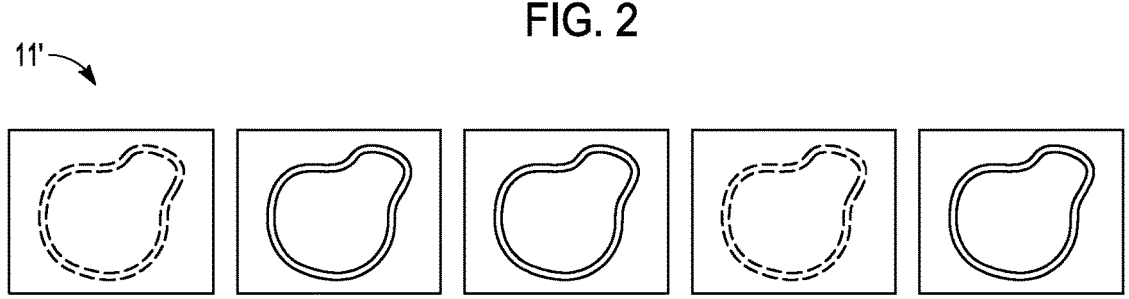

A further sequence 11' of projection states is represented in FIG. 3. This sequence corresponds to the sequence of states off/on/on/off/on which can be interpreted as a code. Hereby, it is an irregular sequence of projection states. As described above, the evaluation device 9 evaluates images of the complete sequence 11', in order to determine a violation or non-violation of the safety area 2 at a certain point in time. Hereby, as above, it is those image points in the camera image which image the safety area 2 which extract the aforedescribed code (e.g. "0 1 1 0 1"). In contrast, as a rule no changes result in the remaining image areas of the camera image, so that the respective image points extract the code "0 0 0 0 0". Hereby, for ascertaining a non-violation of the safety area 2, not only must the images include the detection of the expected image for each pixel position, but furthermore also include the precise sequence.

Figure 4:
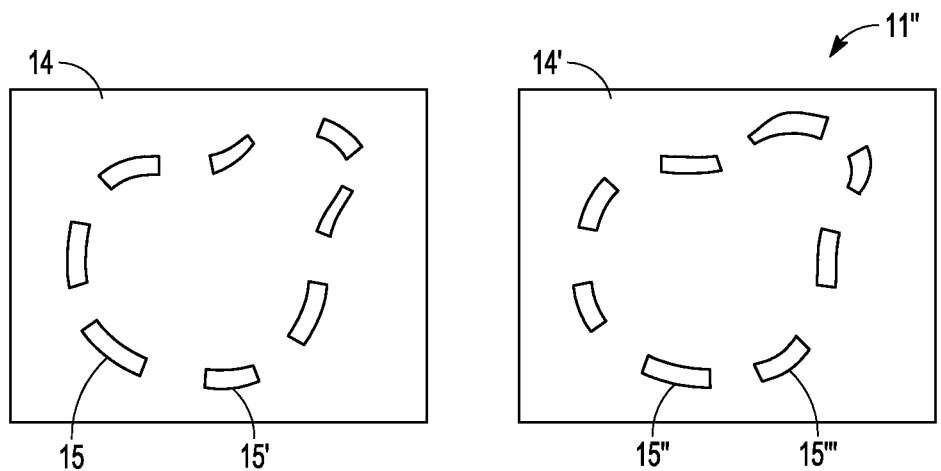

FIG. 4 shows an exemplary embodiment, concerning which one not only modulates the sequence in a temporal manner, but also spatially. In the represented example, the sequence 11" merely comprises two projection states 14, 14'. The projection states 14, 14' each comprise projected sections of the boundary line of the safety area 2, wherein two sections for each of the two projections states 14, 14' are characterised by way of example with the reference numerals 15 and 15', and 15" and 15''' respectively. The sections 15 and 15', and 15" and 15''' are separated from one another by way of non-illuminated sections of the boundary line. The sections of the boundary line which are not projected in the first projection state 14 are projected in the subsequent projection state 14'. Instead of non-illuminated sections, sections with a projection of another colour or intensity can however also be envisaged. On account of the projection of the sections, a detection performance of the appliance 1 can be improved, since objects also entail a shifting of one or more sections 15 and 15', and 15" and 15''' given an interruption of the boundary line of the safety area 2. These sections 15 and 15', and 15" and 15''' are therefore perceived at a changed image position in the camera image, counter to expectations. An associated nominal image, apart from the image position, at which the safety area 2 is expected, can also define the expected section as a code at this location. In some embodiments, it is also possible for the sections 15 and 15', and 15" and 15''' not to be illuminated in an alternating manner. Instead, one can envisage an unambiguous code being projected for each section, said code again having to be extracted at the expected image position. The images and the expected images in this case comprise codes which are different for the individual sections.

Figure 5:
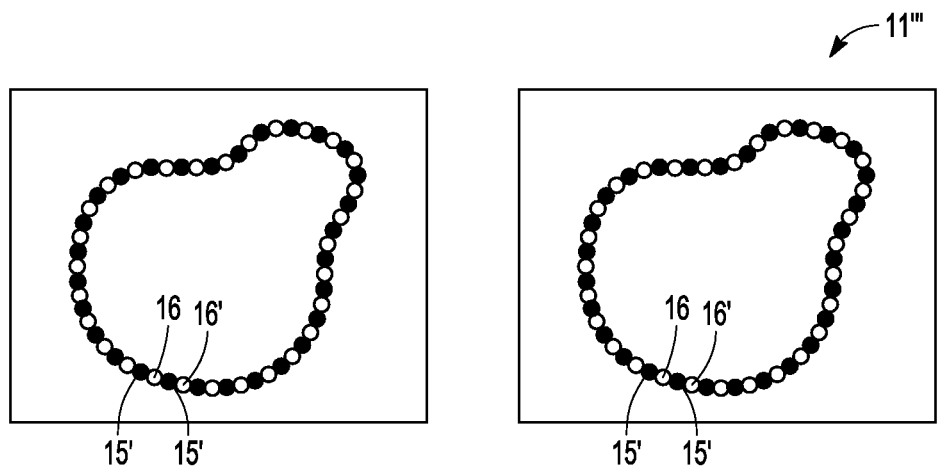

FIG. 5 shows a sequence 11''' which corresponds to the sequence 11", wherein the sections 15, 15' however are designed smaller and in a point-like manner. Hereby, the filled-out circles are to represent illuminated point-like sections 15, 15', wherein the circles which are not filled out are to represent non-illuminated (or illuminated with a different colour and/or intensity) sections 16, 16'. The point-like sections for example can have a comparatively smaller diameter of 2 cm.

A further sequence 11'''' is schematically represented in FIG. 6. Hereby, two different projection states 17, 17' are shown merely by way of example, wherein the sequence 11'''' comprises further projection states which are not represented. In this embodiment, sections 15, 15' are projected as described above. These projected sections 15, 15' in several consecutive projection states of the sequence 11'''' run around the boundary line of the safety area 2 for example in the clockwise direction, as is indicated by the arrow with the reference numeral 18. As a rule, one envisages the boundary line being completely illuminated within the sequence 11"". In this context, the projection state 17 can form the first projection state of the sequence and the projections state 17' the last projection state of the sequence.

FIG. 7 schematically shows a further sequence 11""'. This for example can comprise only two different projection states. Hereby, as described above, different sections 19, 19' of the boundary line of the safety area 2 are illuminated in consecutive projections states 20, 20'. The sections 19, 19' each run round the boundary line of the safety area 2 and are interlaced in one another. In the first projection state 20, the first section 19 is illuminated, whereas the position of the second section 19' is merely indicted by a dashed line. In contrast, in the second projection state 20 the second section 19' is illuminated, whereas the position of the first section 19 is merely indicated by a dashed line.

As is shown in FIGS. 8(*a*) and (*b*), rectangles can also be used as structuring elements of a pattern. For example, a type of chequerboard pattern can be used, wherein directly adjacent fields are each projected at different points in time. In contrast to unstructured points which accordingly change depending on the shape and position of the line, with the fields of the chequerboard a fixed spatial relationship would be given. The positions of all fields of the chequerboard pattern can therefore be pre-computed and precisely the fields which lie at the position of the safety area 2 to be projected or at its boundary can be selected during the creation of the safety area 2. In the shown example, the sections consist of rectangular fields. The positions of the fields can be pre-computed and have a fixed relation to the world. The fields which are finally used for the representation of the current safety area 2 can be activated or deactivated in an individual manner. Directly adjacent fields are typically each represented in the other projection state. One therefore has alternating adjacent sections which are covered given a violation of the safety area, e.g. by a human hand, as has been described above for example with reference to FIG. 5. The projections states which are shown in FIGS. 8(*a*) and (*b*) belong to a sequence. Herein, the fields which are represented in a filled-out manner, of which two are provided by way of example with the reference numerals 21 and 21,' are projected, As a whole, the quantity of all fields results in the closed boundary line of the safety area 2.

The embodiments of the different figures can be combined with one another, so that for example sections which are interlaced in one another can again be subdivided along the boundary line into different sections. For example, one can also envisage these sections running around the boundary line within the sequence. Generally, the sections can be arranged regularly or irregularly and/or have uniform or different shapes and sizes.

Features of the different embodiments which are merely disclosed in the embodiment examples can be combined with one another and claimed individually.

The invention claimed is:

1. An appliance for creating and monitoring a safety area in a working space, comprising:
    a recording device which is configured to record an image in a monitoring area which encompasses the safety area;
    an illumination device which is configured to project at least one of a line or a pattern which define the safety area, into the working space;
    an evaluation device which is configured to evaluate the image which is recorded by the recording device with respect to a violation of the safety area; and
    wherein the illumination device is configured to project a specified temporally coded sequence of the at least one of the line or the pattern into the working space, and wherein the evaluation device is configured to compare images of the temporally coded sequence of the at least one of the line or the pattern with an expected sequence and to output a violation signal when the image of the temporally coded sequence do not correspond to the expected sequence; and
    wherein the evaluation device is configured to compare images projected by the illumination device in the temporally coded sequence that includes at least one of: (1) the line or pattern moving or otherwise modulated to create a spatial difference between images in the temporally coded sequence; or (2) more than two consecutive projection states.

2. The appliance according to claim 1, wherein the temporally coded sequence of the at least one of the projected line or pattern comprises at least three consecutive projection states, so that at least three images are evaluated for determining the violation of the safety area.

3. The appliance according to claim 2, wherein the temporally coded sequence consists of at least two different projection states.

4. The appliance according to claim 1, wherein the temporally coded sequence of the at least one of the projected line or pattern also comprises a spatial modulation of the at least one of the projected line or pattern.

5. The appliance according to claim 4, wherein the temporally coded sequence of the at least one of the projected line or pattern comprises a consecutive illumination of different sections of a boundary line of the safety area.

6. The appliance according to claim 5, wherein the temporally coded sequence of the at least one of the projected line or pattern comprises an alternating illumination of the different sections of the boundary line.

7. The appliance according to claim 6, wherein the temporally coded sequence of the at least one of the projected line or pattern consist of a projection state that corresponds to an uninterrupted boundary line.

8. The appliance according to claim 5, wherein the boundary line of the safety area forms a closed line, wherein the sequence of the at least one of the projected line or pattern comprises a sectionwise successive illumination of a complete boundary line.

9. The appliance according to claim 1, wherein the evaluation device is configured to form a differential image from at least two images of the temporally coded sequence and to compare the differential image to the expected sequence.

10. The appliance according to claim 1, wherein a control unit which is connected to the illumination device and which is configured to activate the illumination device for adapting the safety area to a changed working condition, in a manner such that the illumination device projects a temporally changing sequence of at least one of a line or pattern into the working space.

11. The appliance according to claim 1, wherein the illumination device is configured to project at least two different projection states of a sequence of the at least one of the line or pattern into the working space at a frequency of at least 10 Hz.

12. The appliance according to claim 1, wherein the illumination device is configured to project the at least one of the line or pattern, which define the safety area, wherein the safety area has a base area of at least 1 m2, into the working space.

13. A method for creating and monitoring a safety area in a working space, comprising the following steps:
providing an appliance, the appliance including:
a recording device configured to record an image in a monitoring area which encompasses the safety area;
an illumination device configured to project at least one of a line or a pattern which define the safety are into the working space; and
an evaluation device configured to evaluate the image which are recorded by the recording device with respect to a violation of the safety area;
projecting a specified temporally coded sequence of lines or patterns which define the safety area, into the working space using the illumination device;
recording images of the temporally coded sequence of the lines or patterns using the recording device;
comparing the images projected by the illumination device of the temporally coded sequence that includes at least one of: (1) the lines or patterns moving or otherwise modulated to create a spatial difference between images in the temporally coded sequence; or (2) more than two consecutive projection states; with an expected sequence using the evaluation device; and
outputting a violation signal using the evaluation device when the image of the temporally coded sequence does not correspond to the expected sequence.

14. The appliance according to claim 1, wherein the illumination device is configured to project at least two different projections states of a sequence of the at least one of the line or pattern into the working space at a frequency of at least 50 Hz.

* * * * *